United States Patent
Subrahmanyan et al.

(10) Patent No.: US 7,944,949 B2
(45) Date of Patent: May 17, 2011

(54) MULTISERVICE SYSTEM AND METHOD FOR PACKET AND TIME DIVISION MULTIPLEXED TRANSPORT

(75) Inventors: Ravi Subrahmanyan, Windham, NH (US); Xingen James Ren, Acton, MA (US); Dimitrios Giannakopoulos, Methuen, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 387 days.

(21) Appl. No.: 11/974,730

(22) Filed: Oct. 16, 2007

(65) Prior Publication Data
US 2009/0097506 A1  Apr. 16, 2009

(51) Int. Cl.
*H04J 3/06* (2006.01)
(52) U.S. Cl. ........................................................ 370/516
(58) Field of Classification Search .................. 370/294, 370/516, 498, 230, 473, 395.62, 412, 232
See application file for complete search history.

(56) References Cited

U.S. PATENT DOCUMENTS

| | | | |
|---|---|---|---|
| 6,205,149 B1 * | 3/2001 | Lemaire et al. | 370/401 |
| 6,356,218 B1 * | 3/2002 | Brown et al. | 341/120 |
| 6,996,737 B2 * | 2/2006 | Bass et al. | 713/502 |
| 7,408,939 B1 * | 8/2008 | Damle et al. | 370/395.1 |
| 7,633,971 B1 * | 12/2009 | Butler et al. | 370/474 |
| 2005/0271066 A1 * | 12/2005 | Valadarsky | 370/401 |

* cited by examiner

*Primary Examiner* — Kwang B Yao
*Assistant Examiner* — Anh Ngoc Nguyen
(74) *Attorney, Agent, or Firm* — Law Office of Gerald Maliszewski; Gerald Maliszewski

(57) ABSTRACT

A system and method are presented for providing packet and time division multiplex (TDM) services in a data communication interface. The method accepts packets at a first rate over a packet interface, and transfers time-sensitive data in the packets as packet data units (PDUs) having a smaller number of bits than a packet and a second rate, faster than the first rate. The method transforms the PDUs into frames in a first TDM protocol. Typically, the PDUs are transformed into units having a smaller number of bits than the PDU and a third rate, faster than the second rate. Then, the TDM frames are transmitted over a line interface.

18 Claims, 6 Drawing Sheets

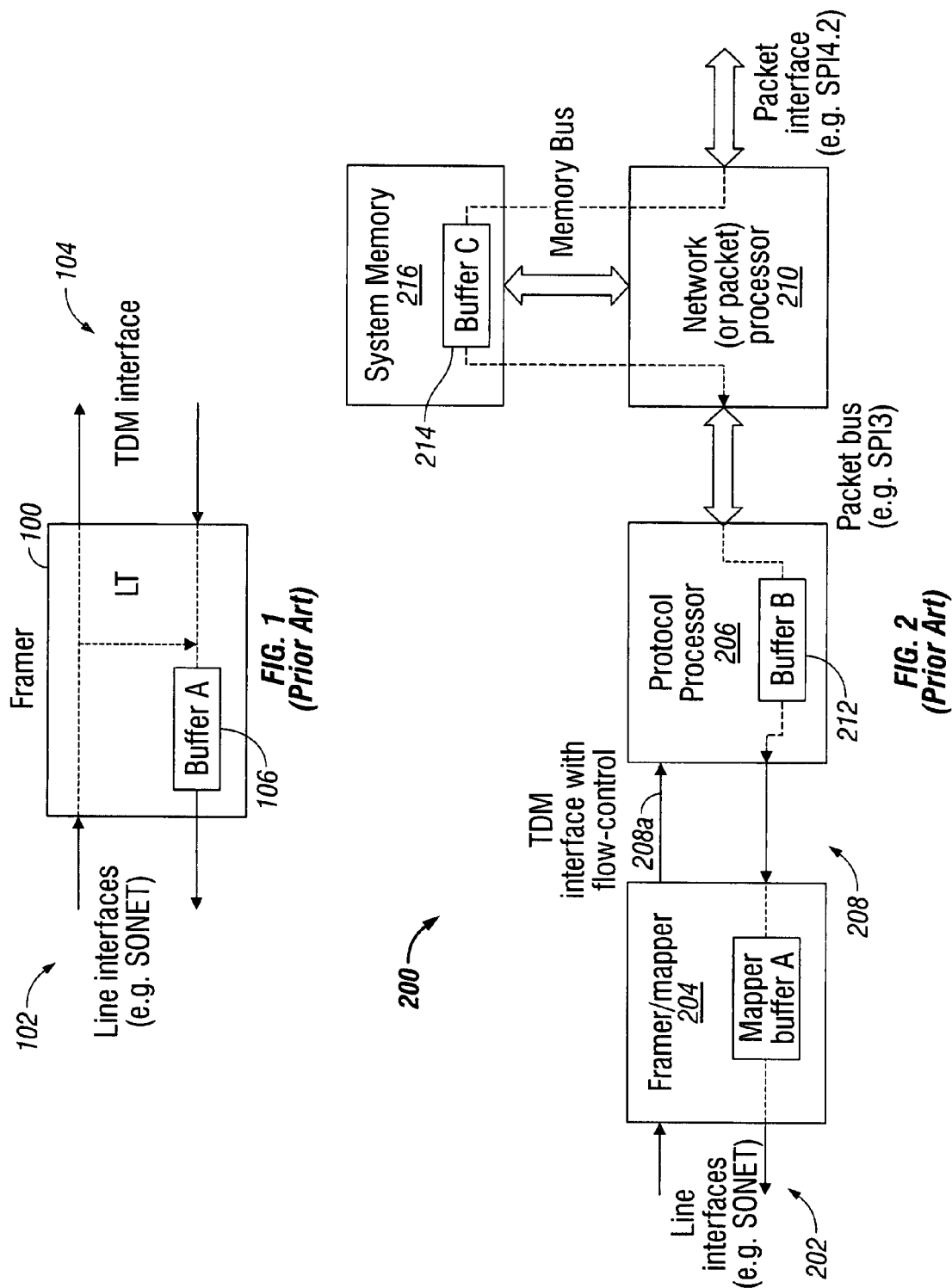

MULTISERVICE SYSTEM AND METHOD FOR PACKET AND TIME DIVISION MULTIPLEXED TRANSPORT

BACKGROUND OF THE INVENTION

1. Field of the Invention

This invention generally relates to digital communication systems and, more particularly, to a system and method for efficiently interfacing time division multiplexed information streams into packet networks.

2. Description of the Related Art

Conventionally, voice has been carried over Time Division Multiplexed (TDM) networks, such as E1/T1/E3/T3 and SDH/SONET networks. The emergence of packet data communications, such as Internet Protocol (IP) networks, has led to the convergence of TDM traffic into the IP networks. Packet networks, which were initially designed to carry time-insensitive data traffic, are not designed to address the concerns of real-time services like voice and video, which are conventionally carried over TDM networks.

Digital transport networks evolved as isolated links connecting analog switching systems for analog Public Switched Telephone Networks (PSTNs). Originally, digitized voice channels were multiplexed onto serial streams, framed, and line coded with completely unsynchronized clocks. Digital communications evolved to Plesiochronous Digital Hierarchy (PDH), which permits clock rates of interfacing streams to vary from a nominal value with a given tolerance. The variance is resolved by elastic stores and, in higher multiplexing rates, by bit stuffing. There are three closely related standards for digital trunks of primary rate, E1-E3 (Asia and Europe), the T1-T3 (North America), and J1 -J3 (Japan). In a PDH transmission chain, a plurality of lower level digital signals are bit-wise, or bit and byte-wise time division multiplexed together to form a higher level signal, with the bit rate of the higher level signal being greater than the sum of the rates of the tributary signals to account for overhead functions in the higher rate signal, such as framing, parity, error detection, alarms, maintenance, and timing adjustment.

The bits of each lower level digital signal are written in an input buffer (one buffer per input tributary), with the write frequency equal to the incoming tributary instantaneous bit rate. The tributary bits are then read, according to a local system clock, and multiplexed by bit-interleaving or byte-interleaving. To take care of deviation in the rates between different tributaries and the multiplex signal, certain bit positions within the output multiplex frame (justification or stuffing opportunity bits) can carry either tributary or dummy bits. The justification decision (i.e., if the stuffing opportunity bit should carry information or be a dummy) is made frame-by-frame on the basis of a buffer threshold mechanism. Therefore, the actual number of tributary bits in the output multiplex frame varies dynamically and the transmission capacity gets adapted to the actual bit rate of the incoming tributary.

In a TDM format, data is transported in small chunks at a regular rate. The data stream is at a more or less uniform rate, with only small perturbations, which occur due to rate adaptation mechanisms within the network, or due to impairments in the network. Within such a network transport applications must maintain the uniformity of the data rate to within tight specifications, which is generally done using a phase conditioning circuit in the transmit path. Such a phase conditioning circuit works by storing data in a buffer and playing it out to a mapper at a regulated rate. In order to maintain low latency requirements, the buffer is small (of the order of several bytes).

Since PDH networks work on independent clocking mechanisms, the differences in clock rates result in buffer slips, whose effect is negligible in voice conversations, but detrimental to data and video traffic. To address this problem, network architectures (SDH/SONET) have been adopted where all the network elements are synchronized and running at the same average frequency. Transient variations are accommodated by a mechanism called pointer adjustments.

In SONET, the base signal is referred to as Synchronous Transport Signal level-1 (STS-1), which operates at 51.84 Mb/s. Higher-level signals are integer multiples of STS-1, creating the family of STS-N signals, for N=1, 3, 12, 48, 192, & 768. An STS-N signal is composed of N byte-interleaved STS-1 signals. The optical counterpart for each STS-N signal is designated as OC-N (Optical Carrier level-N). TDM traffic is mapped onto an SPE (SONET) or a virtual container (SDH), which in turn is associated with Path Over Head (POH) to form an Administrative Unit in SDH. The pointer mechanism is used to take care of the asynchronous phase of the SONET/SDH traffic and also to compensate for frequency offsets between transmission systems.

FIG. 1 depicts a conventional framer device used in transport applications (prior art). This device 100 has a line interface 102 on one side (e.g. to a SONET/SDH line) and a TDM interface 104 on the other side, which can interface to a cross-connect or protocol processor. The buffer (A) 106 used by the phase conditioning circuit (not shown), is operating in the transmit direction with respect to the line interface 102. In an end-to-end transport application the buffer 106 is used to condition the data rate coming from the TDM interface 104 and going out over line interface 102.

In a data-termination application timing can either be sourced from the framer, or by loop-timing from the receive direction. The loop timing is indicated by the arc marked "LT". In data-termination applications, the data coming over the TDM interface 104 is generally sourced from a non-TDM source, e.g. a packet source like ATM packets, IP packets, or some other encapsulation for the data. The TDM interface 104 may still be used, but generally does not carry timing information, and flow control is used to control the data rate over that interface. As a result of this flow control, the data rate coming over the TDM interface can be significantly more variable than normal TDM data. The buffer 106 (buffer A) together with the phase conditioning circuit is then used to set the timing for the data, either via system timing or loop timing.

FIG. 2 shows the architecture of a typical system for transport of data over TDM and packet networks (prior art). The system 200 has a line interface 202 on one side, which would be a TDM interface such as a SONET/SDH interface or a PDH interface. This interface feeds a framer or multiplexer device tool for extracting the encapsulated TDM data and passes it to a protocol processor 206 over an interface 208a with flow-control support. The protocol processor 206 extracts the packetized data from the TDM data, or encapsulates the TDM data into packets and passes it to a network processor 210 for further processing or switching. In such a system, the information contained within the packets does not define the timing of the TDM streams over the line interface, and system or loop timing is used within the framer to set the timing on the transmit line interface 202. The system 200 maps between the small chunks of regular data in the TDM domain and less frequent, and generally less regular, large packets of data in the packet domain.

In such a system, data generally passes through multiple buffers. There may be a buffer in the protocol processor 212 (buffer B), and the size of this buffer depends on whether the protocol processor has a store-and-forward architecture with large buffers, or a cut-through architecture with small buffers. The network processor 210 generally has large buffers 214 (buffer C), which can be maintained in external system memory 216 as shown. These large buffers are tolerable because data latency is not a major concern in data applications, and the bursty nature of packet traffic, as compared with normal TDM data, requires larger buffers for storage.

FIG. 3 is a diagram depicting a simplified version of the system of FIG. 2 (prior art). The functions of the protocol and network processors can logically be combined into a "packet-processing" function as shown, where a generic packet processor 300 is shown replacing the separate protocol and networks processors of FIG. 2. The interface between the packet processor 300 and the framer/mapper 204 may be a packet interface in some implementations, or a TDM interface in other implementations.

Circuit-switched technology dedicates a fixed amount of bandwidth to a connection, regardless of actual bandwidth usage. These networks generally do not handle data efficiently or scale to cost-effectively accommodate data traffic growth. The primary disadvantage of SONET/SDH networks is that they are optimized for TDM traffic. The protocol lacks the functions required to handle data as efficiently as packet traffic.

Due to the growth of the Internet and multimedia traffic, packet networks (e.g., IP networks) have increased. The advantage of IP networks include their ability to handle variety of media types, simplicity, lower relative cost, resilience, less operations and administrative complexity, and the large amounts of bandwidth (tens of Mbps or Gbps). Packet-switched networks are designed for data communications and computer networking. The information is broken down into the form of small packets and such packets from multiple sources are sent over a single network simultaneously and reassembled at the destinations. Packet switching enables more efficient utilization of available network bandwidth than circuit-switching. A single node-to-node link can be dynamically shared by packets over time, assign priorities to packets, and block new connections as the traffic increases. Packet networks permit the cost-efficient expansion of capacity as communications traffic increases. Ethernet, as defined in IEEE 802.3, is the most popular networking technology used to transport IP packets.

Voice over Internet Protocol (VoIP) uses IP packets to transport voice bytes through an enterprise or access network, at the core of the network, or from end terminal to end terminal. In an enterprise scenario, IP Phones communicate to an IP PBX or a gateway over IP protocol where the voice channels are converted and switched through the circuit switched network. As applied to the edge of the network, the access is still circuit-switched or PSTN, and the voice connection is switched through the packet network using a media gateway. At the terminating end, another media gateway performs the protocol conversion, if the call is destined to a PSTN phone. For end-to-end IP phones, the IP packets containing voice are traversed all the way through packet networks, using a protocol such as H.323.

However, there is a need for applications that transport digital trunks themselves (e.g., PDH) over packet networks. These applications would be useful in the access networks as well as at the edge of networks, where legacy digital trunk infrastructure already exists.

Circuit Emulation Services (CES) is one technology intended for transporting E1/T1/E3/T3 or SONET/SDH traffic over packet networks. Pseudo Wire Emulation Edge-to-Edge (PWE3) defines the emulation of services (such as Frame Relay, ATM, Ethernet T1, E1, T3, E3, and SONET/SDH) over packet-switched networks (PSNs) using IP or multiprotocol label switching (MPLS). The Pseudo Wire functions include encapsulating the traffic, carrying it across a path or tunnel, managing timing and order, and any other operations required to emulate the behavior and characteristics of the service.

When emulating a TDM or circuit-switched service over the packet switched network, the characteristics of the emulated service are expected. Appropriate design considerations include availability, survivability, interoperability, delay, jitter, and wander. The most important problem to be solved is the effect of end-to-end delay and delay variation. The end-to-end delay is a result of the packetization, network transport delay, and de-packetization functions. The de-packetization function includes the jitter buffers which perform the delay equalization. Considering the fact that the network transport delay can be guaranteed in a well-controlled transport network, delay introduced by the packetization and de-packetization functions becomes crucial. The delay variation contributes to the jitter at the receiving end. Further, packet networks are prone to dropped or misaligned packets, which may be critical in circuit emulation services.

The other major problem in transporting TDM services on the packet networks is synchronization. In the Plesiochronous Digital Hierarchy (PDH) the timing is passed transparently through the networks, allowing the clock to be accurately regenerated at the remote end of the carrier network. In Synchronous Digital Hierarchy (SDH), physical line rates as well as external timing equipment provide timing information. However, the physical line rates on the packet networks are independent of the media data rates itself, and the timing information is degraded as soon the TDM traffic enters the packet domain.

It would be advantageous if timing-sensitive services could be incorporated into packet data architectures. It would be advantageous if a multistage architecture could be used to relieve a packet processor from managing phase conditioning at the bit level as required in TDM communications. It would also be advantageous if the multistage architecture could relieve a mapper from having to deal with large chunks of data when communicating time-sensitive communications.

SUMMARY OF THE INVENTION

A communication architecture is provided for efficiently mapping timing-sensitive communications to and from a packet stream. The architecture provides low latencies for the timing-sensitive communications, while simultaneously supporting the transport of large packets at lower data rates.

Accordingly, a method is provided for providing packet and TDM services in a data communication interface. The method accepts packets at a first rate over a packet interface, and transfers time-sensitive data in the packets as packet data units (PDUs) having a smaller number of bits than a packet at a second rate, faster than the first rate. The method transforms the PDUs into frames in a first TDM protocol. Typically, the PDUs are transformed into units having a smaller number of bits than the PDU and a third rate, faster than the second rate. Then, the TDM frames are transmitted over a line interface.

In one aspect, the packets are accepted at a varying first rate. Then, transferring time-sensitive data in the packets as PDUs includes buffering the packets in a first buffer and supplying PDUs having a second rate variance enabled through either a modified PDU size or modified second rate, in response to the varying first rate.

In another aspect, the PDUs are transformed into frames by accepting PDUs having the second rate variance and buffering the PDUs in a second buffer. The buffered PDUs are phase conditioned, and data is supplied with a phase resolution of less than one bit-interval.

Alternatively, if it is determined that the packets do not contain time-sensitive data, the non-time-sensitive data is transformed into either a TDM protocol or a packet protocol, and transmitted using a flow-control handshaking mechanism.

Additional details of the above-described method, and a data communication system for providing packet and TDM services are provided below.

BRIEF DESCRIPTION OF THE DRAWINGS

FIG. 1 depicts a conventional framer device used in transport applications (prior art).

FIG. 2 shows the architecture of a typical system for transport of data over TDM and packet networks (prior art).

DETAILED DESCRIPTION

Figure 3:
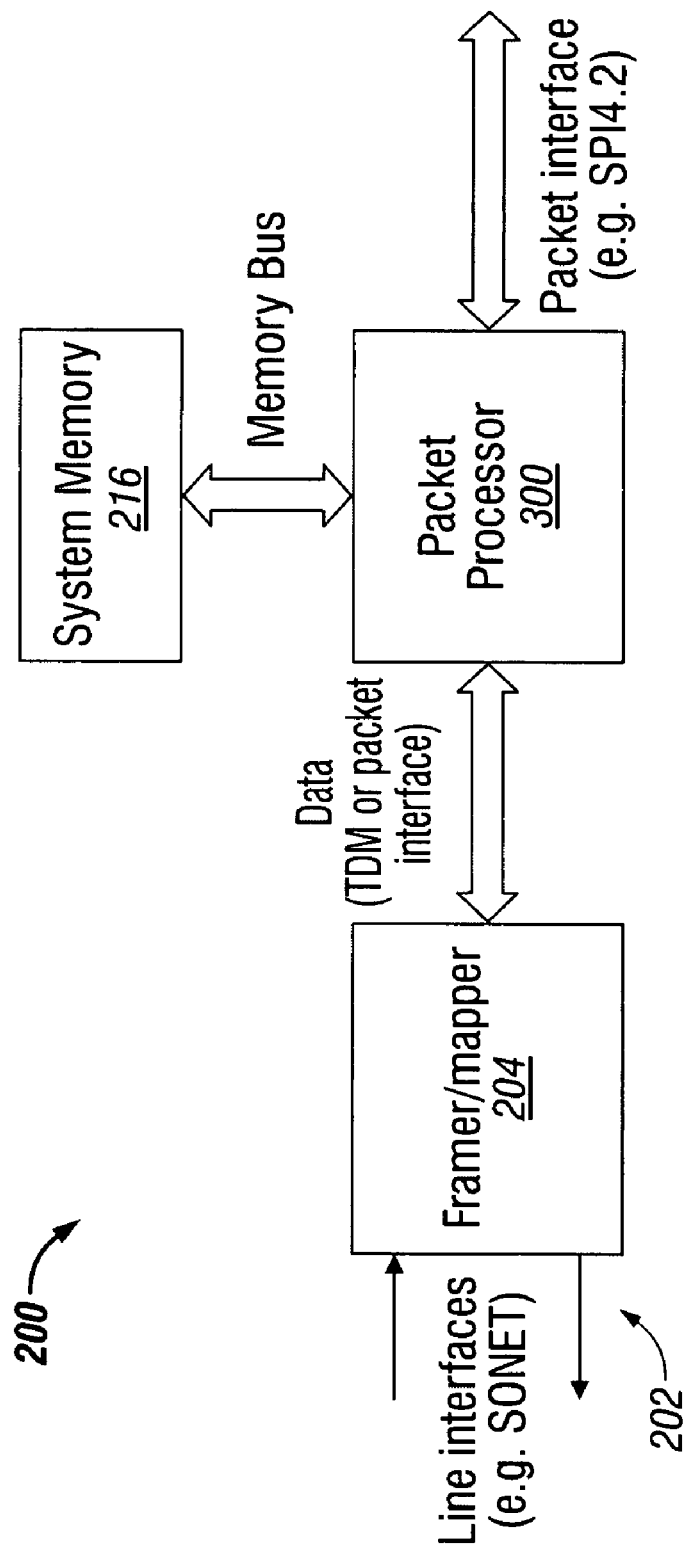
FIG. 3 is a diagram depicting a simplified version of the system of FIG. 2 (prior art).

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

Figure 4:
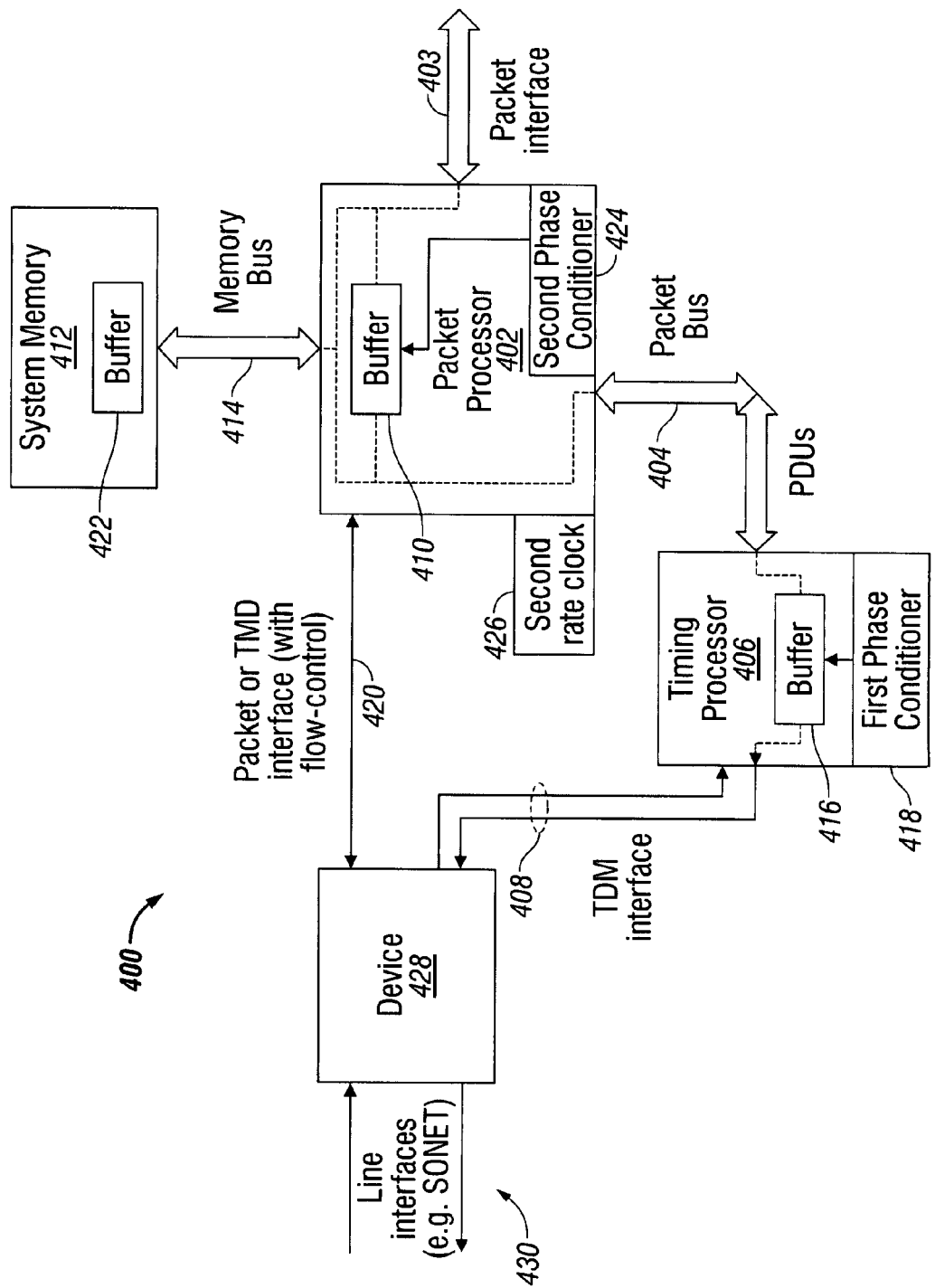
FIG. 4 is a schematic block diagram depicting a data communication system for providing packet and time division multiplexed (TDM) services.

FIG. 4 is a schematic block diagram depicting a data communication system for providing packet and time division multiplexed (TDM) services. The system 400 comprises a packet processor 402 having a packet interface on line 403 to accept packets at a first rate, and a packet bus on line 404 for transferring time-sensitive data in the packets as packet data units (PDUs). For example, the packet interface on line 403 may be a SPI4.2 interface. However, other packet protocols are known in the art and the system is not limited to any particular protocol. The PDUs have a smaller number of bits than a packet and a second rate, faster than the first rate. A timing processor 406 has an interface on line 404 to accept the PDUs. The timing processor 406 transforms the PDUs into frames in a first TDM protocol for transmission over a TDM interface on line 408. For example, the first TDM protocol may be SDH/SONET or PDH. In one aspect, the packet processor 402 supplies PDUs with data in units of about 16 bytes at a second rate of about 80 microseconds (μs).

The packet processor 402 includes a first buffer 410. In some aspects not shown, buffer 410 may be embedded with system memory 412 and connected to the packet processor 402 via memory bus 414. The packet processor 402 accepts packets at a varying first rate. Typically, the first rate varies in response to packetization, network transport delay, and de-packetization functions. The packet processor 402 buffers the packets in the first buffer 410 and supplies PDUs having a second rate variance that is enabled by either modifying the PDU size or modifying the second rate, in response to the varying first rate.

The timing processor 406 transforms the PDUs into units having a smaller number of bits than the PDU and a third rate, faster than the second rate, for transmission over the TDM interface 408. More explicitly, the timing processor 406 includes a second buffer 416 and a first phase conditioner 418. The timing processor 406 accepts PDUs having the second rate variance and buffers the PDUs in the second buffer 416. The first phase conditioner 418 supplies buffered PDUs with a phase resolution of less than one bit-interval at the TDM interface 408.

In some aspects, the packet processor 402 accepts packets on line 403 with non-time-sensitive data. The packet processor 402 transforms non-time-sensitive data into either a TDM protocol or a packet protocol. The packet processor 402 transmits the non-time-sensitive data at a non-time-sensitive interface 420 using a flow-control handshaking mechanism.

Flow-control is the process of managing the rate of data transmission between two nodes. Flow-control mechanisms can be classified by whether or not the receiving node sends feedback to the sending node. Flow-control becomes important if it is possible for a sending node to transmit information at a faster or slower instantaneous rate than the destination node can receive and process them.

In other aspects, the packet processor 402 includes a third buffer 422, larger than the first buffer 410, a second phase conditioner 424, and a second rate clock 426. As shown, third buffer 422 is embedded with system memory 412 and connected to the packet processor 402 via memory bus 414. Alternately but not shown, third buffer 422 may be embedded in the packet processor 402. The packet processor 402 supplies non-time-sensitive data to the non-time-sensitive interface for 420 at a rate responsive to flow-control commands received at the non-time-sensitive interface. The packet processor second phase conditioner 424 supplies phase conditioned PDUs from the first buffer 410 to the packet bus 404, responsive to the second rate clock 426.

The packet processor 402 monitors for bad packets and out-of-order packets. In response to detecting out-of-order packets, the packet processor 402 reorders the packets. The packet processor 402 monitors for lost packets. In response to detecting either a bad or lost packet, the packet processor 402 replaces the detected packet with an equivalent amount of filler data, and transfers PDUs with the filler data on line 404. If the packet processor has only one buffer (i.e., buffer 410), then the buffer has to be large enough to handle packets. If the buffering function is split between two buffers, e.g., 422 and 410, then buffer 422 is the larger buffer, for packet processing. Then, data from buffer 422 can be put into buffer 410, which is used only for the phase conditioning and scheduling of PDUs. In this case, buffer 410 can be relatively small since buffer 422 is large enough to handle the packet processing.

The system 400 may further comprise either a framer/mapper or multiplexer device 428 having an interface on line 408 connected to the timing processor TDM interface. In the direction from TDM to packets, a framer is used to frame up the TDM data and send it into the packet direction. In the other direction, a mapper+phase conditioner is used as part of the chain of transferring data from packets to TDM. The device 428 reformats frames in the first TDM protocol to frames in a second TDM protocol, and transmits frames in the second TDM protocol at a line interface on line 430. Note: packet data on line 420 may be transformed into the second TDM protocol by mapper 428. TDM protocol on line 420 may be passed through to interface 430 or converted to the second TDM protocol. Likewise, the device 428 may pass first TDM protocol communications on line 408 through to line interface 430.

Viewed from another perspective, the timing processor 406 has a TDM interface on line 408 for accepting frames in the first TDM format and transferring time-sensitive data in the frames as PDUs on the packet bus of line 404 at a second rate. Then, the packet processor 402 transforms the PDUs into packets with a larger number of bits than the PDU and having a first rate, slower than the second rate. The packet processor 402 transmits the packets over the packet interface on line 403.

Likewise, the packet processor 402 may accept first TDM protocol frames with non-time-sensitive data on line 420. The packet processor 402 transmits the non-time-sensitive data as packets over packet interface 403.

Although not shown, in some aspects the functions of the packet processor may be divided into separate network processor and protocol processor functions as shown in FIG. 2. Although system 400 has been defined in terms of hardware circuitry, it should be understood that some elements of the system may be enabled as microprocessor instructions stored in memory and executed by a microprocessor or logic-coded state machine.

Functional Description

The above-described system is useful in carrying timing-sensitive TDM data over packet networks. In such a system, the data coming over the packet interface (see FIG. 2) into the network processor must be mapped to the transmit side line with its timing intact. In order to do this, it is sometimes necessary to recover the timing adaptively from the data in the packet stream. Even if this is not the default architecture (i.e., the default timing mode), the adaptive recovery is required as a backup mode in the system. Therefore, adaptive recovery must be supported.

The recovery of the timing of the encapsulated TDM stream can theoretically be done by the same phase-conditioning circuits that are used in the mapper. However, those circuits are optimized for transport applications, with appropriate bandwidths and low latencies. Specifically, one difference between the TDM transport and packet transport is that the data coming over the packet interface has high-amplitude, low frequency components that have to be removed in order to meet the timing requirements of the TDM standards. The circuits in the mapper are not suited for filtering out such components, since these circuits are optimized for TDM applications. The buffers in a mapper are also small compared to the buffer sizes needed to handle packets, because conventional mappers are designed for TDM data (a few bytes of data flowing through with low latencies), while packets have large numbers of bytes per packet.

Normally, the packets that carry the TDM data are of a larger size than the bit or byte-level transport typical of TDM transport. The transport of larger data chunks is a key advantage which adds to the efficiency of packet networks, as compared to TDM networks, and is one of the reasons for the migration towards packet networks and the emergence of systems for maintaining traditional TDM services over new packet networks.

An architecture for adding an alternate path that supports the time-sensitive communications is shown in FIG. 4. A separate timing processor (e.g., enabled in a field programmable gate array (FPGA)) is added as an alternate path for overcoming the limitations of the phase conditioning circuits in a conventional mapper. Data flows through the system as follows:

1) For conventional applications, data flows in the path from the mapper to the packets processor using flow-control.

2) For time-sensitive applications, the data flows in the path from the mapper, to the timing processor, and then to the packet processor.

Protocol-level functions such as header processing are done in the packet processor, which has access to the large system memory. The large buffers needed for packet processing can, therefore, be kept in the packet processor. Other required functions include the removal of bad packets, replacement of missing packets with an equivalent number of bits (though the data integrity obviously is not maintained), and most importantly, reordering of misordered packets within a certain window. As a result of the requirement to reorder packets, the packet processor must maintain a sufficiently large buffer size to store as many packets as are needed for the reordering and replacement functions.

Since the packets carrying TDM data can be large (for example, 200 bytes or greater), their direct transferal into the timing processor would require a sufficiently large buffer to store the packets as they are played out over the TDM interface towards the mapper. A key aspect of this architecture mitigates that issue. Instead of transferring entire packets to the timing processor, the packet processor breaks the packets into smaller chunks. These packets are scheduled out to the timing processor at regular intervals using the traffic-managements functions available in the packet processor. This scheduling has the effect of converting the low-packet-rate, large-size packet rate into a higher-packet-rate, lower-size transfer, which is advantageous for designing the phase conditioning circuits in the timing processor. The rate at which the transfer takes place, and/or the size of the chunk used to transfer the data from the packet processor to the timing processor can be varied slightly in order to maintain a transfer rate proportional to the incoming rate of the data contained in the packets, and to prevent the buffers in the packet processor or the timing processor from overflowing. Some flow-control can also be used between the packet processor and timing processor.

It could be argued that the packet processor itself can do all the phase conditioning and transfer directly to the mapper. However, this phase conditioning is impractical in practice. The packet processor is typically optimized for processing data in packet-sized or chunks of many bytes and, therefore, is highly inefficient in transferring data at the byte level or the bit level. In one aspect, the data transfer from the packet processor is in 16-byte pieces, though the system is not limited to any particular number. This scheduling permits the buffer in the timing processor to be small and optimized for its phase conditioning circuit, as opposed to being large enough to hold one or more packets.

Figure 5:
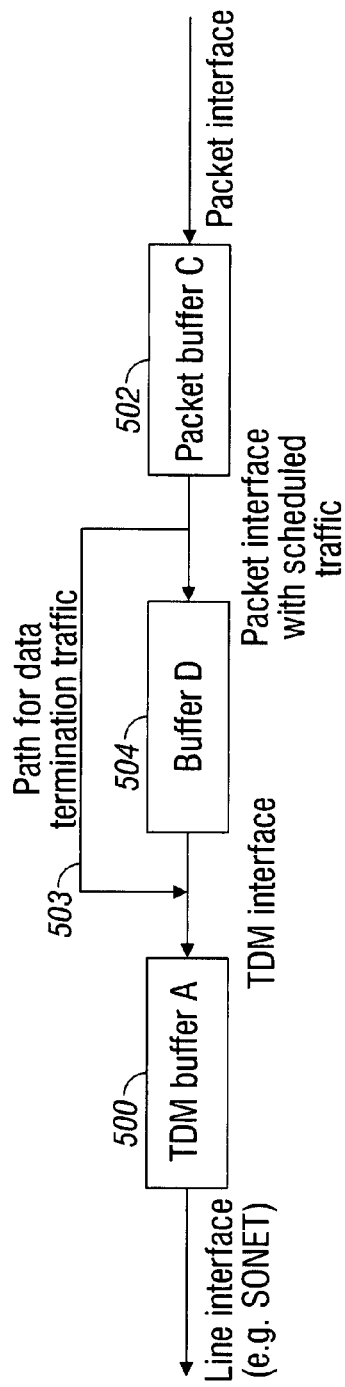
FIG. 5 is a diagram depicting communication flow from a packet processor through a timing processor.

FIG. 5 is a diagram depicting communication flow from a packet processor through a timing processor. Packets carrying TDM data come into the packet processor buffer 502 (buffer C) via a packet interface. The packet processor extracts the TDM payload data and schedules it out to the timing processor in smaller pieces, where it is stored in buffer D (504). The data from buffer D is played out to the mapper by the phase conditioning circuit in the timing processor, and stored in the mapper's buffer A (500). The mapper does the final stage of phase conditioning required to meet TDM timing standards. As shown, for data termination applications, the path 503 that bypasses the timing processor (buffer D) can be chosen. In other aspects, TDM buffer 500 may be embedded with the timing processor, or the function may be performed by timing processor buffer 504 with associated phase-conditioning circuitry.

In addition, the TDM timing standards require phase control to the sub-bit level (i.e. lower than one bit-time), which is very difficult over the conventional packet processor packet bus interfaces. The TDM timing phase control is best done in circuitry downstream from the packet processor. However, as pointed out above, the circuits in a mapper are typically optimized for transport applications, and cannot handle large chunks of data and also cannot attenuate the very low frequency components that would be directly sourced from a packet network.

The timing processor is optimized for attenuating the high-amplitude, low-frequency components present in the traffic coming over the packet network, as well as to condition the phase variation of the outgoing data (going into the mapper) to at least a byte (or even sub-byte) level. The transfer from the timing processor to the mapper can be byte or bit oriented. The final bit-level remapping into the line interface may be performed by the mapper.

Figure 6:
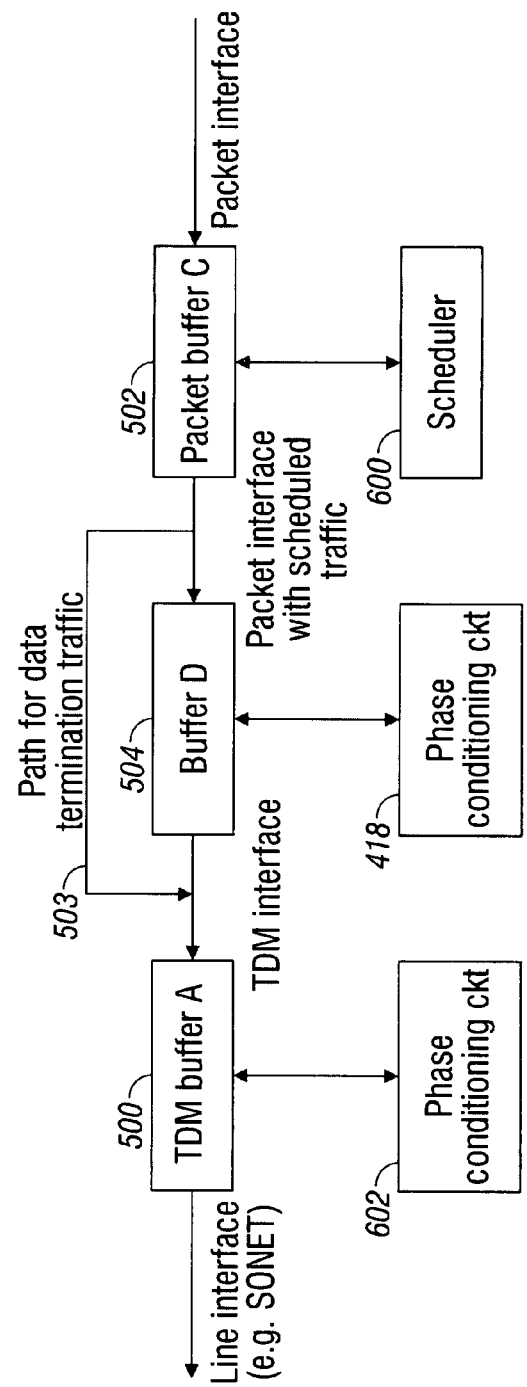
FIG. 6 is a diagram depicting the relationship of the buffers to the timing circuits in the different components of the system.

FIG. 6 is a diagram depicting the relationship of the buffers to the timing circuits in the different components of the system. When in synchronous mode, phase conditioning in the packet processor by scheduler 600 is not necessary, and the timing processor (which includes buffer 504 and phase conditioner 418) is bypassed. Phase-conditioning, if necessary, is performed by phase conditioner 602 in the mapper. If the mapper is originating the timing, then no phase conditioning is needed; it's fixed by default. If loop timing is being used, then phase conditioning may be necessary. The mapper requests data, or stops data using flow control, and does the phase conditioning in its buffer. In some aspects two buffers may be used, one for the flow-control and one for the phase conditioning.

By separating the functions into different stages, it is possible to achieve significantly higher density designs than a conventional design that may perform the entire transformation from packets to TDM in a single step or stage. For example, using such a design a 2xOC-3 to OC-12 communications system may be implemented.

Going from the TDM side out of the packet interface (SPI4.2 is an example), the timing sensitive data, say a DS1 bit stream, is packed into bytes, and some number of bytes are collected into a packet so that the DS1 data is packetized. A header containing information, such as checksums and source/destination addresses, is added on top of the data bytes to create the final packet. Since the DS1 data is TDM and arrives regularly, the packets also go out more or less regularly in this direction.

In the other direction, such a packet, which originates in a similar system on the other side of the packet network, following the scheme described above, comes over the SPI4.2 interface as a packet. In this direction, the packet processor checks the header, checksums, and performs other de-packetizing functions, and then queues up the packets. If the packets are out of order, they are reordered. Then, the data is taken out of the packet and sent in smaller, more frequent pieces to the timing processor. The process of taking what was originally a low-jitter (timing clean) bit stream, packetizing it, and then sending it over a packet network, can delay different packets by different amounts, even get them out of order, and degrade the timing of the time-sensitive communications. The present invention packet processor and timing processor act to recover the timing, so that the time-sensitive data can be transmitted over a TDM interface.

Since the PDUs are smaller than packets, it's possible to send them at a consistent data rate, faster than the packet data rate. For example, a packet may carry time-sensitive data (e.g. a PDH signal) at a packet rate R, of 1 Mb/s. This packet rate doesn't change, from network end-to-end. If each packet is comprised of 200 bytes, the packet source rate R=1e6 bits/s, or in bytes, R=125 kB/s (bytes). The packet rate=R/(8*200) =625 packet/s. By breaking each packet into PDUs of a size of 20 bytes, 10 PDUs are transmitted for each packet received. Thus, the PDU rate is 10 times faster than the packet rate. The PDU rate=6250 kiloPDU/s.

As another example, packets may be accepted in units of about 200 bytes every 1 millisecond (ms) and transferred as PDUs in units of about 16 bytes every 80 microseconds (µs). Then, the PDUs are transformed into frames in a TDM protocol in units of about 1 byte every 5 µs.

Figure 7:
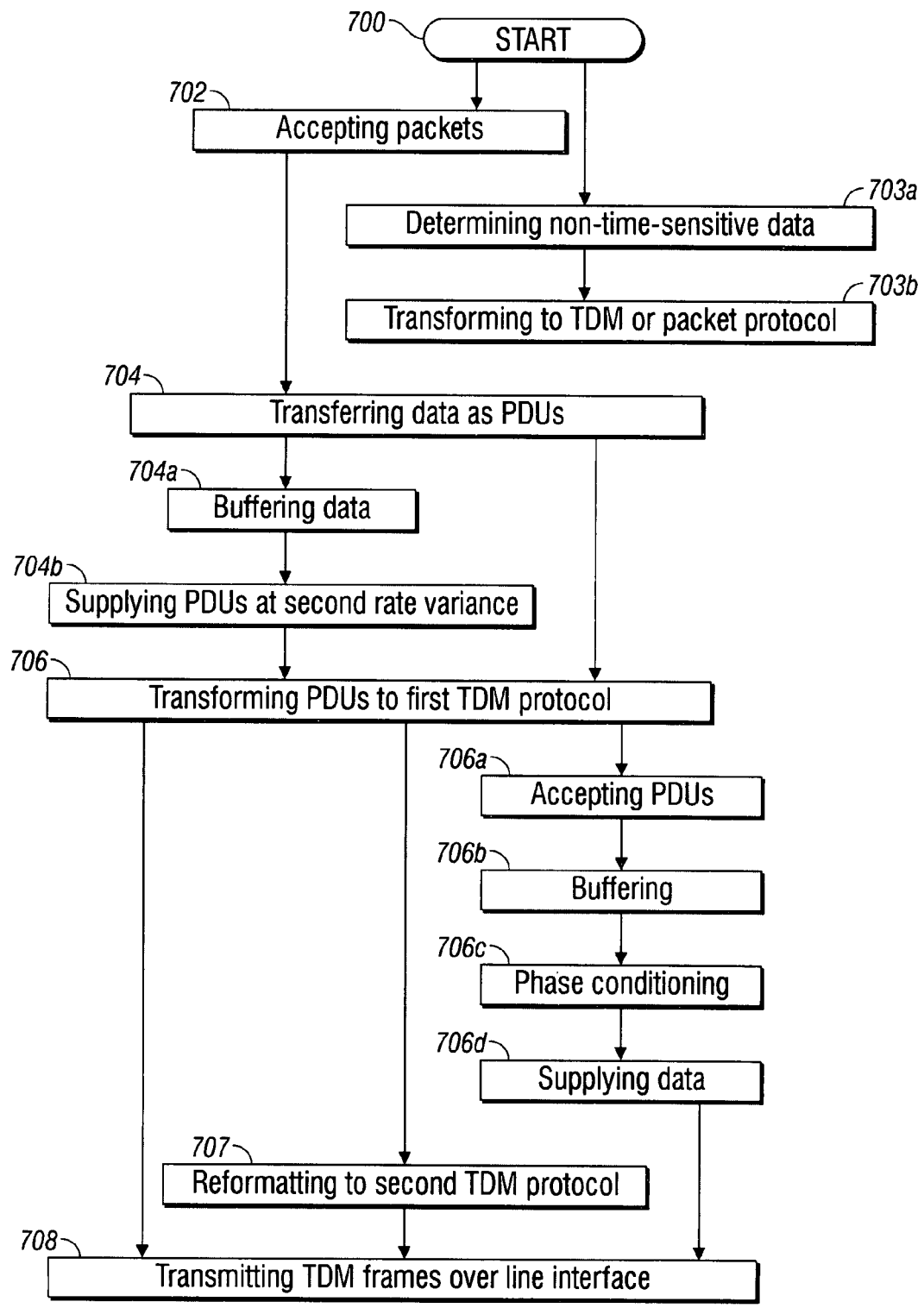
FIG. 7 is a flowchart illustrating a method for providing packet and TDM services in a data communication interface.

FIG. 7 is a flowchart illustrating a method for providing packet and TDM services in a data communication interface. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 700.

Step 702 accepts packets at a first rate over a packet interface. Step 704 transfers time-sensitive data in the packets as PDUs having a smaller number of bits than a packet and a second rate, faster than the first rate. For example, PDUs may be transferred as data in units of about 16 bytes every 80 microseconds (µs). Step 706 transforms the PDUs into frames in a first TDM protocol. For example, the first TDM protocol may be SDH/SONET or PDH. In one aspect, the PDUs are transformed into units having a smaller number of bits than the PDU and a third rate, faster than the second rate. Step 708 transmits TDM frames over a line interface.

In one aspect, accepting packets at the first rate in step 702 includes accepting packets at a varying first rate. Then, transferring time-sensitive data in the packets as PDUs in Step 704 includes sub-steps. Step 704a buffers the packets in a first buffer. In response to the varying first rate, Step 704b supplies PDUs having a second rate variance that is either a modified PDU size or a modified second rate.

In another aspect, transforming the PDUs into frames in the first TDM protocol Step 706 includes sub-steps. Step 706a accepts PDUs having the second rate variance. Step 706b buffers the PDUs in a second buffer. Step 706c phase conditions the buffered PDUs. Step 706d supplies data with a phase resolution of less than one bit-interval.

In one aspect, Step 703a determines if the packets contain time-sensitive data in response to accepting the packets (Step 702). If the packets do not contain time-sensitive data, Step 703b transforms non-time-sensitive data into a TDM protocol or a packet protocol, and transmits the non-time-sensitive data using a flow-control handshaking mechanism. In one variation, Step 703b buffers the non-time sensitive packets in a third buffer, and supplies data from the third buffer at a rate responsive to flow-control commands.

In contrast, transferring time-sensitive data in the packets as PDUs in Step 704 includes supplying phase conditioned PDUs from the first buffer at a rate responsive to a second rate clock. In one aspect, supplying the PDUs includes monitoring for bad packets, monitoring for out-of-order packets, reorder in the packets in response to detecting out-of-order packets, and monitoring for lost packets. Further, in response to detecting either a bad or and lost packet, the detected packet is replaced with an equivalent amount of filler data and the PDUs are transferred with the filler data.

In another aspect, Step 707 reformats frames in the first TDM protocol to frames in a second TDM protocol. Then, transmitting TDM frames over the line interface in Step 708 includes transmitting frames in the second TDM protocol.

Figure 8:
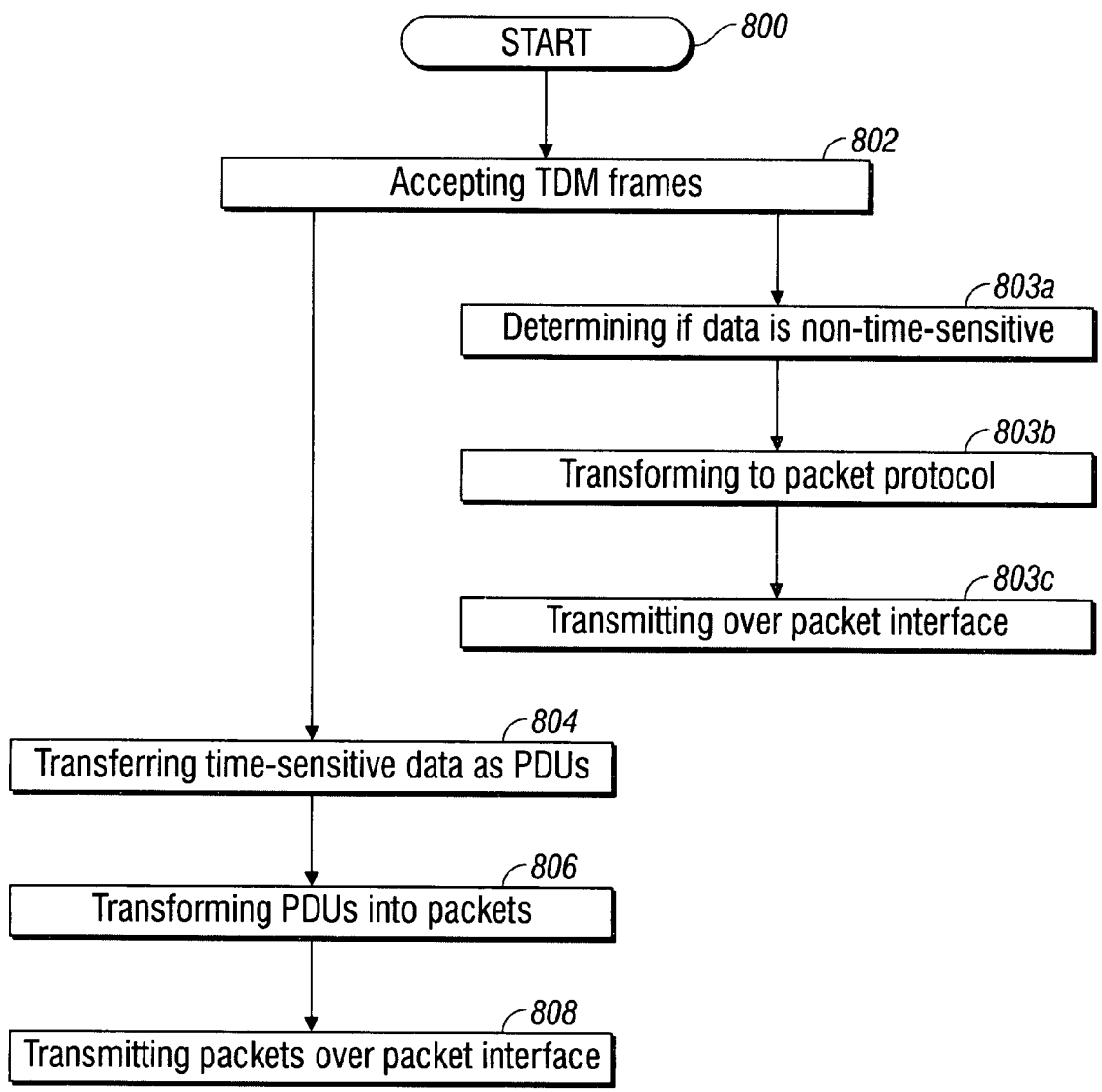
FIG. 8 is a flowchart illustrating an alternate method for providing packet and TDM services.

FIG. 8 is a flowchart illustrating an alternate method for providing packet and TDM services. The method starts with Step 800. Step 802 accepts frames in a first TDM format over a TDM interface. Step 804 transfers time-sensitive data in the frames as PDUs having a second rate. Step 806 transforms the PDUs into packets, having a larger number of bits than a PDU, and having a first rate, slower than the second rate. Step 808 transmits the packets over a packet interface.

In one aspect, Step 803a determines if the frames contain time-sensitive data in response to accepting the frame. If the frames do not contain time-sensitive data, Step 803b transforms the non-time-sensitive data to packet protocol, and Step 803c transmits the non-time-sensitive data as packets over a packet interface.

A system and method are presented for providing packet and TDM services. Examples of particular circuit blocks and logical steps have been given to illustrate the invention. However, the invention is not limited to merely these examples. Other variations and embodiments of the invention will occur to those skilled in the art.

We claim:

1. In a data communication interface, a method for providing packet and time division multiplexed (TDM) services, the method comprising:
a packet processor accepting packets at a varying first data rate over a packet interface, the first data rate varying in response to a clock having a nominal rate with a tolerance;
the packet processor transferring to a timing processor time-sensitive data in the packets as packet data units (PDUs) having a smaller number of bits than a packet, at a second data rate, faster than the first data rate, with a second data rate variance responsive to the first data rate clock tolerance;
the timing processor transforming the PDUs into frames in a first TDM protocol as follows:
accepting PDUs having the second data rate variance;
buffering the PDUs in a second buffer;
phase conditioning the buffered PDUs; and,
supplying data with a phase resolution of less than one bit-interval; and,
the timing processor transmitting TDM frames over a line interface.

2. The method of claim 1
wherein transferring time-sensitive data in the packets as PDUs includes:
buffering the packets in a first buffer; and,
in response to the varying first data rate, supplying PDUs having the second data rate variance selected from a group consisting of a modified PDU size and a modified second rate.

3. The method of claim 1 wherein transforming the PDUs into frames in the first TDM protocol includes transforming the PDUs into units having a smaller number of bits than the PDU and a third data rate, faster than the second data rate.

4. The method of claim 2 further comprising:
in response to accepting the packets, determining if the packets contain time-sensitive data; and,
if the packets do not contain time-sensitive data, transforming non-time-sensitive data to a format selected from a group consisting of a TDM protocol and a packet protocol, and transmitting the non-time-sensitive data using a flow-control handshaking mechanism.

5. The method of claim 4 wherein transforming the non-time-sensitive data includes:
buffering the non-time sensitive packets in a third buffer; and,
supplying data from the third buffer at a data rate responsive to flow-control commands; and, wherein transferring time-sensitive data in the packets as PDUs includes supplying phase conditioned PDUs from the first buffer at a data rate responsive to a second rate clock.

6. The method of claim 5 wherein transferring time-sensitive data as PDUs includes:
monitoring for bad packets;
monitoring for out-of-order packets;
in response to detecting out-of-order packets, reordering the packets;
monitoring for lost packets;
in response to detecting a packet selected from a group consisting of bad and lost packets, replacing the detected packet with an equivalent amount of filler data; and,
transferring PDUs with the filler data.

7. The method of claim 1 further comprising:
reformatting frames in the first TDM protocol to frames in a second TDM protocol; and,
wherein transmitting TDM frames over the line interface includes transmitting frames in the second TDM protocol.

8. The method of claim 1 wherein transforming the PDUs into frames in the first TDM protocol includes transforming into a first TDM protocol selected from a group consisting of SDH/SONET and PDH.

9. The method of claim 2 wherein transferring the time-sensitive data as PDUs includes transferring data in units of 16 bytes every 80 microseconds (μs).

10. A data communication system for providing packet and time division multiplexed (TDM) services, the system comprising:
a packet processor having a packet interface to accept packets at a varying first data rate, a first buffer, and a packet bus for transferring time-sensitive data in the packets as packet data units (PDUs) having a smaller number of bits than a packet, at a second data rate, faster than the first data rate, with a second data rate variance response to the varying first data rate, where the first data rate varies in response to a clock having a nominal rate with a tolerance; and,
a timing processor having an interface to accept the PDUs, a second buffer, and a first phase conditioner, the timing processor transforming the PDUs into frames in a first TDM protocol for transmission over a TDM interface by buffering the PDUs in the second buffer, with the first phase conditioner supplying buffered PDUs with a phase resolution of less than one bit-interval at the TDM interface.

11. The system of claim 10 wherein the packet processor buffers the packets in the first buffer and supplies PDUs having the second data rate variance selected from a group consisting of a modified PDU size and a modified second rate.

12. The system of claim 10 wherein the timing processor transforms the PDUs into units having a smaller number of bits than the PDU and a third data rate, faster than the second data rate, for transmission over the TDM interface.

13. The system of claim 11 wherein the packet processor accepts packets with non-time-sensitive data, transforms non-time-sensitive data to a format selected from a group consisting of a TDM protocol and a packet protocol, and transmits the data at a non-time-sensitive interface using a flow-control handshaking mechanism.

14. The system of claim 13 wherein the packet processor includes a third buffer, a second phase conditioner, and a second rate clock;
wherein the packet processor supplies non-time-sensitive data to the non-time-sensitive interface at a data rate responsive to flow-control commands received at the non-time-sensitive interface; and,
wherein the packet processor second phase conditioner supplies phase conditioned PDUs from the first buffer to the packet bus, responsive to the second rate clock.

15. The system of claim 14 wherein the packet processor monitors for bad packets and out-of-order packets, and in response to detecting out-of-order packets, reordering the packets, the packet processor monitoring for lost packets, and in response to detecting a packet selected from a group consisting of bad and lost packets, replacing the detected packet with an equivalent amount of filler data and transferring PDUs with the filler data.

16. The system of claim 10 further comprising:
a device selected from a group consisting of a framer/mapper and a multiplexer having an interface connected to the timing processor TDM interface, the device reformatting frames in the first TDM protocol to frames in a second TDM protocol and transmitting frames in the second TDM protocol at a line interface.

17. The system of claim 10 wherein the timing processor transforms the PDUs into frames in a first TDM protocol selected from a group consisting of SDH/SONET and PDH.

18. The system of claim 11 wherein the packet processor supplies PDUs with data in units of 16 bytes at a second rate of about 80 microseconds (μs).

* * * * *